(12) United States Patent
Wurz

(10) Patent No.: US 8,385,539 B2
(45) Date of Patent: Feb. 26, 2013

(54) METHOD AND ARRANGEMENT FOR CONTROLLING ADAPTIVE FILTERS

(75) Inventor: Johann Wurz, Zwettl (AT)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 678 days.

(21) Appl. No.: 12/515,073

(22) PCT Filed: Nov. 17, 2006

(86) PCT No.: PCT/DE2006/002016
§ 371 (c)(1),
(2), (4) Date: Nov. 18, 2009

(87) PCT Pub. No.: WO2008/058493
PCT Pub. Date: May 22, 2008

(65) Prior Publication Data
US 2010/0054455 A1   Mar. 4, 2010

(51) Int. Cl.
*H04M 9/08* (2006.01)
(52) U.S. Cl. .............. 379/406.08; 379/406.04
(58) Field of Classification Search ........... 379/406.08
See application file for complete search history.

(56) References Cited

U.S. PATENT DOCUMENTS

| | | | | |
|---|---|---|---|---|
| 5,353,346 | A * | 10/1994 | Cox et al. ............ | 379/386 |
| 6,865,270 | B1 * | 3/2005 | Troxel .............. | 379/406.02 |
| 2006/0115077 | A1 * | 6/2006 | Laberteaux et al. .... | 379/406.01 |

FOREIGN PATENT DOCUMENTS

| | | |
|---|---|---|
| EP | 0760575 A2 | 3/1997 |
| WO | 9321695 | 10/1993 |
| WO | 2008/058492 A1 | 11/2006 |

OTHER PUBLICATIONS

International Preliminary Report on Patentability for PCT/DE2006/002016 (Form PCT/IPEA/409).

* cited by examiner

*Primary Examiner* — Walter F Briney, III
(74) *Attorney, Agent, or Firm* — Buchanan Ingersoll & Rooney PC

(57) ABSTRACT

The invention relates to methods for controlling adaptive filters, where a first step involves a first input signal, which has a narrowband frequency range and occurs at least intermittently during an adaptation phase in the filter, at the input of the filter prompting the adaptation phase to be continued until an echo signal which is conditional upon the first input signal and in the same frequency range is compensated for completely, a second step involves the adaptation phase being suspended when complete compensation for the echo signal has been achieved, and a third step involves the adaptation phase being continued if the first input signal is followed by a second input signal which has a narrowband frequency range and which differs from the frequency range of the first input signal at least by a frequency value, with the above steps being repeated starting at the first step, or with a fourth step involving a new adaptation phase being performed if the first input signal is followed by a third input signal having a wideband frequency range. The invention also relates to an arrangement for carrying out the method.

11 Claims, 2 Drawing Sheets

METHOD AND ARRANGEMENT FOR CONTROLLING ADAPTIVE FILTERS

CROSS-REFERENCE TO RELATED APPLICATIONS

This application is the United States national phase under 35 U.S.C. §371 of International Patent Application No. PCT/DE2006/002016, filed Nov. 17, 2006. That application is incorporated by reference herein.

BACKGROUND OF THE INVENTION

1. Field of the Invention

The invention relates to a method for the adaptive filtering of signals as well as an arrangement for the adaptive filtering of signals.

2. Description of the Related Art

The use of adaptive filters is known in digital signal processing, that is, filters that are in a position to adapt their filter coefficients independently to the input signal.

The problem exists, particularly during the use of adaptive filters with so-called echo cancelers, which are used primarily in telecommunications and particularly during voice transmission over networks based on the Internet Protocol (IP)—the so-called Voice over IP (VoIP), that, if narrowband signals such as sinus tones occur during a phase in which the filter is adapted, it leads to erroneous adaptations.

An adaptive filter functions ideally, particularly if a white noise signal is present, since all frequencies occur simultaneously then, and all the information for calculating the coefficients of the adaptive filter is received from the echo path (transmission channel, telephone line). Information for the non-occurring frequencies is lacking with narrowband signals, which can lead to a drifting away of the coefficients.

What is known about this is that the adaptation phase is prolonged until a broadband signal is present once again, which ideally is equal to a white noise, representing an indication of the adaptation's reaching an optimal state.

In the meantime a drifting of the coefficients adapted to the echo, needed for the suppression of the echo thus cannot be prevented.

Furthermore, according to known solutions, the narrowband signals are detected by means of a comparison between the so-called crest factor (peak factor) of a received (voice) signal $R_{in}$, which describes the relationship between peak value and effective value of the voice signal, and the arithmetic mean value of the received (voice) signal $R_{in}$.

It is a disadvantage that the crest factor is not a clear sign of a narrowband signal, since broadband signals can also generate the same crest factor. In addition, narrowband signals that are not detectable via the crest factor can also occur.

BRIEF SUMMARY OF THE INVENTION

The task of the invention is to indicate an optimized method as well as an arrangement for controlling adaptive filters, particularly as regards echo cancellation.

In the method for controlling adaptive filters according to the invention, in a first step, an input signal displaying a narrowband frequency range occurring at least occasionally during a filter adaptation phase at the input to the filter continues the adaptation phase until complete compensation of an echo signal induced by the initial input signal in the same frequency range occurs. In a second step, upon reaching the complete compensation of the echo signal, a suspension of the adaptation phase is carried out. In a third step, a continuation of the adaptation phase is implemented then, if a second input signal, displaying a narrowband frequency range differing by at least one frequency value from the frequency range of the first input signal, follows the first input signal, leading to a repetition of the abovementioned steps, beginning with the first step. Or else a new adaptation phase is carried out in a fourth step, if a third input signal displaying a broadband frequency range follows the first input signal.

According to the invention, an initial state is realized in which a normal adaptation to a broadband signal occurs; a second state, during which a reduced adaptation to a narrowband signal occurs; and a third state, during which the adaptation is suspended, if a narrowband signal is no longer provided and there is a complete compensation of the echo signal in this narrowband frequency range. In the process a change of state from each of the states mentioned into each of the others can take place. This depends on the sequence of signals.

It is thereby ensured that the adaptation, adapted to the type of signal present, takes place and thus the problems of the coefficients drifting away, which occurs during narrowband signals, and the erroneous adaptations are avoided, because, narrowband signal after narrowband signal, a complete compensation of the corresponding echoes takes place and, due to the suspension, the adaptation is resumed only when a broadband signal is present, thus providing optimal conditions for a regular adaptation.

It is particularly advantageous if, according to a another embodiment, the adaptation phase in the first step occurs with a small step width. As a result, the instabilities of adaptation that are caused during a rapid adaptation due to a fluctuation of the coefficients are avoided.

It is preferable and also particularly advantageous if a second embodiment of the invention is designed in such a way that in the first step and/or the fourth step an updating of the coefficients occurs. In the first step according to the invention, the advantageous core idea of the adaptation to the narrowband signals is further supported, particularly when several narrowband signals follow one another, and in the second step a new adaptation to the optimal adaptation conditions offered by the broadband signal takes place.

Detection of the bandwidth of the first, second and third signals and the respective echoes is done preferably by filtering using a band-stop filter, a notch filter in particular. This filtering is especially suited for detecting a narrowband signal; a zero point of the filter that results after the adaptation of the filters to the signal fed to it can be used as an input variable for the following evaluation steps during filtering using a notch filter.

A further embodiment of the invention is especially applicable. A continuation of the adaptation occurs then during the first step, if a narrowband input signal is detected and a resulting echo signal has the same frequency range. A suspension of the adaptation occurs then if a narrowband input signal is detected and a resulting echo signal has another frequency range—the latter providing the advantageous indication that the echo canceler has completely compensated for any previous echo caused by a narrowband signal. The adaptation is taken up during the third step as well if a broadband input signal is detected.

If, according to another embodiment of the invention, the frequency range of a narrowband signal includes a subset of a maximum frequency range supplied by a transmission channel and the subset is compared with an initial parameter, then a value, obtained for example by means of simulation, can be defined for a range that reproduces the 'narrowband' property optimally.

"Narrowband" means therefore anything from a sufficiently small frequency range to a single frequency.

The adaptive filter according to the invention is distinguished by control means for the carrying out the aforementioned initiated approaches and thus allows advantageously the implementation and completion of the inventive method, with its advantages being accentuated.

The adaptive filter in an further embodiment is designed preferably with

- at least an initial band-stop device for filtering an input signal from the adaptive filter, designed so that a narrowband input signal is detected, during which an initial frequency range of the input signal is determined,
- at least one power determination device to determine a level of the input signal and the filtered input signal, which is part of the inventive narrowband detection;
- at least one initial comparator device to compare the level, during which an initial control signal is generated, which is reproduced, for example, as the result of a Boolean logical decision "Narrowband YES/NO";
- at least a second band-stop device for filtering an echo signal received by the adaptive filter, designed so that a second frequency range is determined for the echo signal;
- at least one subtraction device, designed so that it subtracts the first frequency range from the second frequency range and forwards it to an amplitude image unit to form the amplitude from the result of the subtraction;
- at least a second comparator device to compare the amplitude of the result with an initial parameter correlating with the narrowband property, during which at least a second control signal is generated;
- an evaluation logic, designed so that, on the basis of the first control signal and a second control signal, it regulates the adaptive filter so that a continuation of the adaptation occurs. The first comparator device determines that the input signal is narrowband and the echo signal has the same frequency range. A suspension of the adaptation takes place then, if a narrowband input signal is detected and the echo signal has another frequency range. The adaptation is taken up during the third step if a broadband input signal is detected ($R_{in}$); thus the specific logical signal "narrowband NO" is present as the first control signal.

Additional particulars as well as the advantages of the invention are explained in greater detail in embodiments depicted in FIGS. 1 and 2.

DETAILED DESCRIPTION OF THE INVENTION

Figure 1:
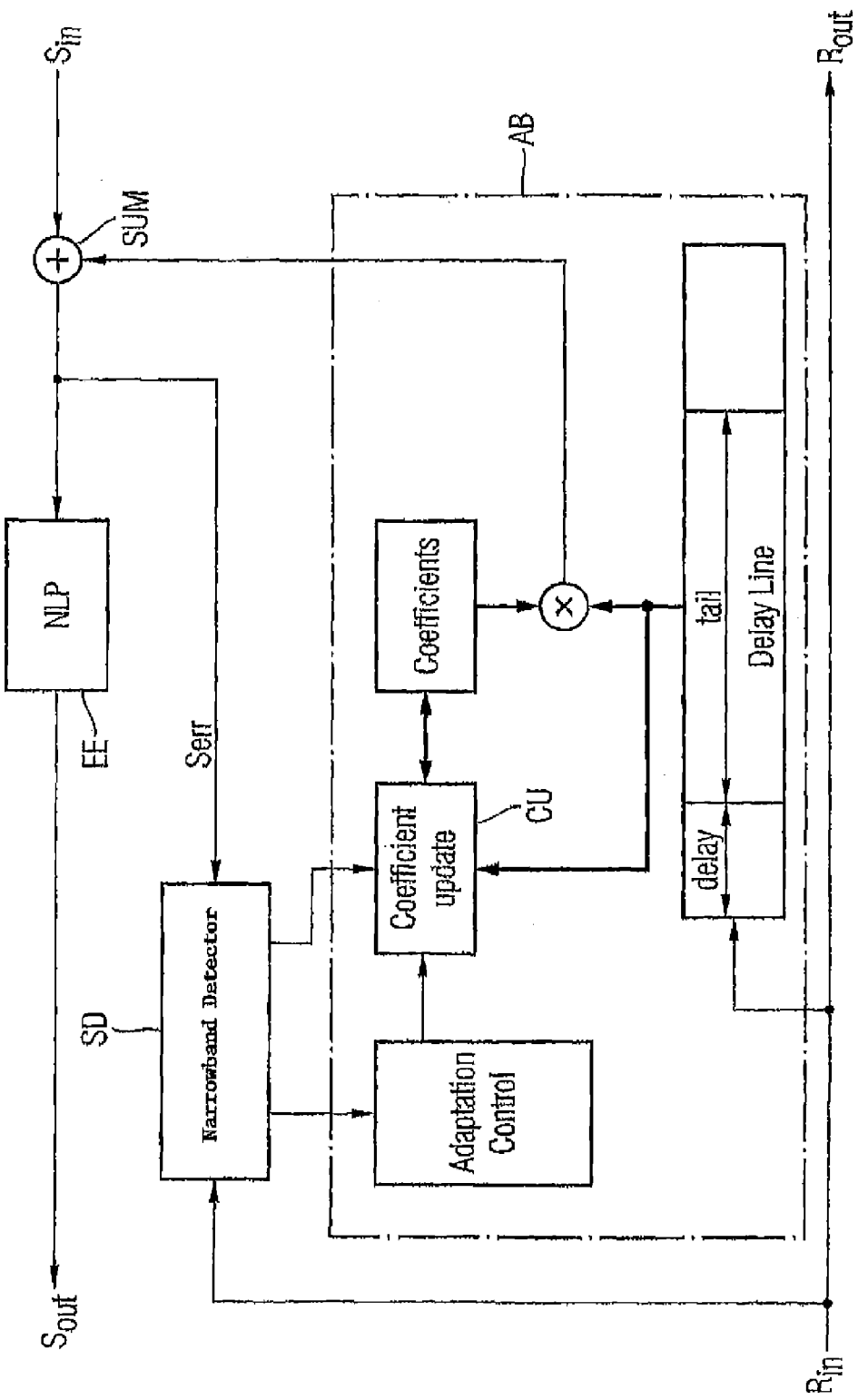
FIG. 1 shows a block diagram of an echo canceler executing the inventive method, which carries out an inventive control of the adaptation based on a narrowband signal detection.

In FIG. 1 the block diagram of an echo canceler executing the inventive method is depicted, which implements the inventive control of the adaptation based on a narrowband signal detection.

In the schematic representation therefore an echo canceler designed according to the invention is represented between the echo path, i.e., the arrow between a first port $S_{in}$, where a voice signal to be sent is emitted on the echo path, and a second port $S_{out}$, where an echo signal arrives from the echo path, plus a third port $R_{in}$, where voice signals to be received from the echo path are input and emitted to the echo path via a fourth port $R_{Out}$.

Represented in addition is an adaptation unit AB, which does the adaptive filtering and generates the coefficients necessary for the adaptation, and an output signal based on it, an estimated echo signal, which is conducted to a summer SUM for the purpose of eliminating an echo, where it is deducted from an echo-affected signal on the echo path, received however by the second port $S_{out}$, and, completely cleansed of the echo in the ideal case, is emitted to the first port $S_{out}$.

In addition, the path between the first port $S_{in}$ and the second port $S_{out}$ has a nonlinear processor, which along with an echo canceler has the function among other things of removing the remainders of interference signals that the adaptive filter cannot compensate for, for example, by damping a remaining interference signal and inserting an artificial background noise, also called a comfort noise, as needed.

To be noted further is that the adaptation unit AB has the processing blocks known to be required for this from prior art. In order to implement the inventive method, at least the adaptation control AC and a CU device to do the usual coefficient update need to be modified in order to interact with the inventive detection of narrowband signals and to carry out the control of the adaptation based upon it.

As may be seen from the representation, to the control of adaptation unit AB at least one control signal, as indicated by the arrow, is added to the adaptation control AC besides more of the usual signals through the inventive narrowband detector SD. Furthermore, at least one control signal is also added to the coefficient update device CU from the narrowband detector SD.

According to the invention, the adaptation is blocked if an echo $S_{err}$ with the same narrowband frequency range initiated by a narrowband interference signal at the third port $R_{in}$—for example, a sinus signal such as a free-line signal, DTMF tones or the like—is completely compensated. The block is lifted, if a broadband signal is once again present at the third port $R_{in}$, which indicates a voice signal and thus a regular adaptation for the echo compensation.

While the narrowband signal is at the third port $R_{in}$, an adaptation with a small step width occurs. Furthermore, if the frequency of the narrowband signal or the frequency of the basic oscillation of the narrowband signal at the third port $R_{in}$ changes, the block occurs only if an echo generated thereby is completely compensated. I.e. the adaptation with the small step width is continued as long as narrowband signals follow one another and blocked only with the compensation of all subsequent echoes, i.e., suspended until the broadband signal is present.

Figure 2:
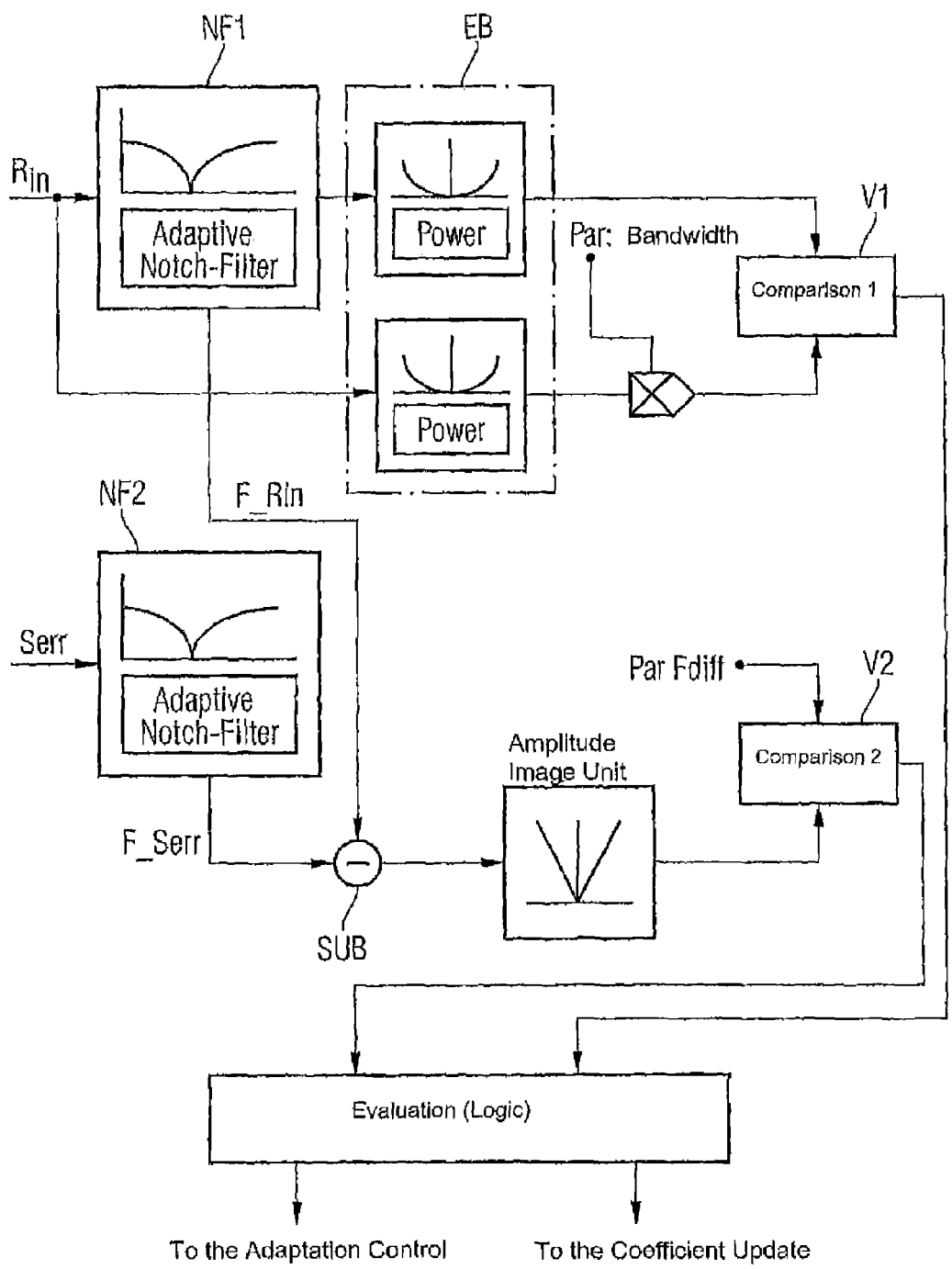
FIG. 2 shows a block diagram of a control implementing the inventive method.

An embodiment of the evaluation logic enabling this inventive method is depicted in FIG. 2.

Depicted is an initial adaptive narrowband filter NF1, also called a band-stop, which is designed as a so-called notch filter in the embodiment represented. This adapts a narrowband signal $R_{in}$ to the frequency range or the frequency of signal F_Rin and conducts the filtered signal to an power determination unit EB.

In the process the first adaptive notch filter NF1 adjusts its zero point so that a maximum block of the signal occurs. For example, if the narrowband signal is a refined sinus signal, the present narrowband signal $Ri_n$ is blocked 100% so that, at the outlet of the first notch filter NF1, there is no signal at the power calculator EB, which generates the quadratic mean value.

Furthermore, this power determination unit (calculator) EB also forwards the signal $R_{in}$ in an unfiltered form so that a power level is determined not only for the filtered but also for the unfiltered signal $R_{in}$, i.e., a quadratic mean value.

At the same time the power or the level of the unfiltered signal is fed to a multiplier and multiplied by a first parameter Par: bandwidth. The first parameter is a value with which the 'narrowband' property can be determined.

The result of the multiplication as well as the power or the level of the filtered signal furthermore are fed to a first comparator device V1. This compares the two levels; the result of this comparison makes it possible to detect whether the signal $R_{in}$ is a signal with a broad frequency band or a narrow frequency band. The narrowband assessment is present if the result of the multiplication is greater than the power or the level of the filtered signal.

If the signal $R_{in}$ is broadband, then according to the invention, an adaptation with a normal step width is carried out, since this is an indication of a voice signal. The adaptation unit AB can concentrate then on the elimination of interferences due to echoes, triggered in particular by cross-talk, because there is no danger of a drifting away of the adaptation coefficients, which would be the case, however, if there were a narrowband input signal Rin. Therefore, an evaluation logic of the adaptation unit AB controls at least one signal.

If, according to the determination result, the present signal $R_{in}$ is not broadband, then according to the invention, an adaptation with smaller adaptation steps occurs, the goal of which is the selective elimination of the narrowband echo. This adjustment of the adaptation speed prevents in an advantageous manner the adaptation from exhibiting any unstable behavior.

To adjust the adaptation speed, the evaluation logic of the adaptation unit AB is therefore controlled and an update of the adaptation coefficients carried out. The coefficient update device CU is actuated accordingly, which ensures the inventive advantage of an avoidance of any drifting.

The inventive method also deals with the problem in an advantageous manner when a narrowband signal is present on a line and only one echo is generated in this comparatively small frequency range. The behavior of this line, i.e., of the echoes usually found there, is therefore unknown in the disjunctive frequency ranges. For that reason it cannot be compensated by the adaptive filter or can even lead to an amplification of the echoes in these unknown frequencies.

As depicted above, the first adaptive narrowband filter NF1 also supplies a blocking frequency through the zero point determination. For example, it may be the sole frequency of the interference signal during a sinus oscillation, or the blocking frequency may allow at least parts of the signal of the signal $R_{in}$ to pass through at the notch filter. This blocking is subsequently fed to a subtraction element SUB. The blocking frequency of the echo $S_{err}$ is also fed to this subtraction element, which is found through a second notch filter NF2 in a manner that is analogous to the first notch filter NF1. These two variables are subtracted from one another, with the result being fed first to an amplitude image creator and then to a second comparator device V2.

This second comparator device V2 then compares the amplitude with a second parameter Par Fdiff; this determines what frequency difference the adaptation is subjected to.

If the comparison carried out by the second comparator device V2 results in the amplitude of the subtraction results being greater than the second parameter, then the adaptation is blocked, that is suspended, and a corresponding check by the evaluation logic is carried out, since the frequencies are categorized as differing from one another. Otherwise the adaptation is continued. That means the adaptation addressed above occurs with smaller adaptation steps, which is initiated by the control mentioned above. In principle then, when the frequency changes, i.e., there is a new frequency on the line (echo) and this supplies additional information about the echo, the adaptive filter is able to compensate for the echo in this frequency range as well. As soon as this frequency range is compensated by the adaptive filter, this frequency disappears at the second notch filter NF2. This adjusts then immediately to another frequency, preferably to the high oscillations that arise due to nonlinear distortions. This is detected then via the subtraction device SUB and the amplitude image creator and used to stop the adaptation.

With the method described above and the arrangement carrying it out, effects due to nonlinear distortions of the high oscillations known in communications as the A-Law—or the A-Law Codecs (G.711), which cause the drifting of the coefficients of the adaptive filter, can be avoided. Thus a detuning of the adaptation that otherwise would adjust after about 10-120 seconds and the erroneous adaptations that would result are avoided. With the inventive method and the arrangement carrying it out, complete adaptation with an appropriate coefficient calculation is even possible when the frequencies occur in a random temporal sequence.

The invention claimed is:

1. A method for controlling adaptive filters, comprising:
a first filter adapting a first signal to a first frequency range;
the first filter transmitting the adapted first signal to a power determination unit and to a subtractor;
transmitting the first signal to the power determination unit;
the power determination unit determining a first power level for the first signal;
the power determination unit determining a second power level for the adapted first signal;
the power determination unit transmitting the first power level to a first comparator device;
the power determination unit transmitting the second power level to a multiplier;
the multiplier multiplying the second power level by a first parameter to obtain a first product;
the multiplier transmitting the first product to the first comparator device;
the first comparator device comparing the first product to the first power level to detect whether the first signal is a narrowband signal or a broadband signal, the first signal being determined to be a narrowband signal if the product is greater than the first power level and the first signal being determined to be a broadband signal if the product is less than the first power level;
upon a determination that the first signal is a broadband signal, an adaptation unit performing an adaptation having a first step width;
upon a determination that the first signal is a narrowband signal, the adaptation unit adapting the first signal to selectively eliminate narrowband echo of the first signal via adapting the first signal via a second step width that is smaller than the first step width, the adaptation unit comprising an adaptation control and a coefficient update device, the selective elimination of the narrowband echo comprising:
a second filter adapting an echo signal to a second frequency range;
the second filter transmitting the adapted echo signal to the subtractor;
the subtractor subtracting the adapted echo signal from the adapted first signal to obtain a difference;

the subtractor transmitting the difference such that an amplitude of the difference is transmitted to a second comparator device;

the second comparator device comparing an amplitude of the difference with a second parameter, upon a determination by the second comparator device that the amplitude of the difference is greater than the second parameter, adaptation or further adaptation of the first signal is blocked; and upon a determination by the second comparator device that the difference is less than the second parameter, continuing adaptation of the first signal by the adaptation unit to selectively eliminate the narrowband echo.

2. The method of claim 1 wherein the selective elimination of the narrowband echo further comprises:

an amplitude imager receiving the difference transmitted by the subtractor such that the amplitude of the difference is transmitted to the second comparator device and the amplitude imager determining the amplitude of the difference for sending to the second comparator device.

3. The method of claim 1 wherein the coefficient update device is updated to avoid drifting upon a determination that the first signal is a narrowband signal.

4. The method of claim 1 wherein the first filter is a band stop and the second filter is a band stop.

5. The method of claim 1 wherein the first parameter is a value with which a narrowband property is determinable.

6. The method of claim 5, wherein a frequency range of the first signal includes a subset of a maximum frequency provided through a transmission channel.

7. An adaptive filter for implementing the method of claim 1.

8. An adaptive filter comprising a filter and control means for implementing a method for controlling adaptive filters comprising:
 i) in a first step, with a first input signal at an input to a filter displaying a narrowband frequency range occurring at least temporarily during an adaptation phase of the filter, the adaptation phase is continued until complete compensation of an echo signal, affected by the first input signal and in the same frequency range, occurs;
 ii) in a second step, upon reaching complete compensation of the echo signal, a suspension of the adaptation phase occurs;
 iii) in a third step, a continuation of the adaptation phase occurs if a second input signal having a narrowband frequency differing from the frequency range of the first input signal by at least one frequency value follows the first input signal, with the steps being repeated, beginning with the first step;
 iv) in a fourth step, a new adaptation phase is begun if a third input signal exhibiting a broadband frequency range follows the first input signal;
 the adaptive filter comprising:
 a) at least one initial band-stop device for filtering an input signal of the adaptive filter, designed so the a narrowband input signal is detected, whereby a first frequency range of the input signal is determined;
 b) at least one power determination device to determine the levels of the input signal and the filtered input signal;
 c) at least a first comparator device to compare the levels, during which at least a first control signal is generated;
 d) at least a second band-stop device for filtering an echo signal received by the adaptive filter, designed so that a second frequency range of the echo signal is determined;
 e) at least one subtraction device designed so that it subtracts the first frequency range from the second frequency range and forwards it to an amplitude image unit to create an amplitude from the result of the subtraction;
 f) at least a second comparator device to compare the amplitude of the result with a first parameter correlating with the narrowband property, with at least a second control signal being generated; and
 g) an evaluation logic, designed so that, on the basis of the first control signal and the second control signal, it controls the adaptive filter so that;
  g1) a continuation of the adaptation occurs if the first comparator device ascertains that the input signal is narrowband and the echo signal has the same frequency range;
  g2) a suspension of the adaptation occurs if a narrowband input signal is detected and the echo signal has another frequency range; and
  g3) the adaptation is resumed during the third step if a broadband input signal is detected.

9. An echo cancelling apparatus comprising:
a first port where an input signal to be sent is emitted on an echo path;
a second port where an echo signal arrives from the echo path;
a third port where the input signal to be received from the echo path is input; and
a fourth port that emits the input signal to the echo path; and
an adaptation unit having an adaptation control and a coefficient update device;
the coefficient update device updating coefficients to avoid drifting when the input signal is detected as being a narrowband signal;
the adaptation control controlling the adaptation unit to selectively eliminate echo from the input signal;
the coefficient update device updating the coefficients to avoid drifting upon a determination made using a coefficient updating method performed by the echo cancellation apparatus that comprises:
a first filter adapting the input signal to a first frequency range and transmitting the adapted first signal to a power determination unit and to a subtractor,
 the input signal also being transmitted to a power determination unit,
 the power determination unit determining a first power level for the input signal
 the power determination unit determining a second power level for the adapted input signal,
 the power determination unit transmitting the first power level to a first comparator device,
 the power determination unit transmitting the second power level to a multiplier,
 the multiplier multiplying the second power level by a first parameter to obtain a first product,
 the multiplier transmitting the first product to the first comparator device,
the first comparator device comparing the first product to the first power level to detect whether the input signal is a narrowband signal or a broadband signal, the input signal being determined to be a narrowband signal if the product is greater than the first power level and the input signal being determined to be a broadband signal if the product is less than the first power level, and
 upon a determination that the input signal is a narrowband signal, the coefficient update device updating coefficients to avoid drifting; and
the adaptation unit selectively eliminating narrowband echo when the input signal is a narrowband signal via an echo elimination method that comprises:

a second filter adapting the echo signal to a second frequency range and transmitting the adapted echo signal to the subtractor;

the subtractor subtracting the adapted echo signal from the adapted input signal to obtain a difference;

the subtractor transmitting the difference such that an amplitude of the difference is transmitted to a second comparator device;

the second comparator device comparing an amplitude of the difference with a second parameter;

upon a determination by the second comparator device that the amplitude of the difference is greater than the second parameter, adaptation or further adaptation of the input signal is blocked; and upon a determination by the second comparator device that the difference is less than the second parameter, continuing adaptation of the input signal by the adaptation unit to continue to selectively eliminate the narrowband echo.

10. The echo cancelling apparatus of claim 9 wherein the adaptation unit applies a first adaptation step size for adapting an input signal that is a broadband signal and a second step size for adapting an input signal that is a narrowband signal, the second step size being smaller than the first step size.

11. The echo cancelling apparatus of claim 9 wherein the first filter is a band stop or notch filter and the second filter is a band stop or notch filter.

* * * * *